United States Patent
Naslund et al.

(10) Patent No.: US 8,887,246 B2
(45) Date of Patent: Nov. 11, 2014

(54) PRIVACY PRESERVING AUTHORISATION IN PERVASIVE ENVIRONMENTS

(75) Inventors: Mats Naslund, Bromma (SE); Tereza Cristina Carvalho, Sao Paulo (BR); Cristina Dominicini, Vila Velha/ES (BR); Makan Pourzandi, Montreal (CA); Rony Sakuragui, Sao Paulo (BR); Marcos Antonio Simplicio Junior, Sao Paulo (BR)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 57 days.

(21) Appl. No.: 13/806,119

(22) PCT Filed: Jun. 22, 2010

(86) PCT No.: PCT/EP2010/058846
§ 371 (c)(1),
(2), (4) Date: Dec. 20, 2012

(87) PCT Pub. No.: WO2011/160683
PCT Pub. Date: Dec. 29, 2011

(65) Prior Publication Data
US 2013/0117824 A1    May 9, 2013

(51) Int. Cl.
H04L 29/06      (2006.01)
H04L 9/32       (2006.01)
H04L 9/08       (2006.01)
H04W 12/02      (2009.01)

(52) U.S. Cl.
CPC .............. *H04L 63/08* (2013.01); *H04L 9/0841* (2013.01); *H04W 12/02* (2013.01); *H04L 63/062* (2013.01); *H04L 63/0407* (2013.01); *H04L 9/32* (2013.01); *H04L 63/0815* (2013.01); *H04L 9/321* (2013.01); *H04L 2209/80* (2013.01)

USPC .............................................................. 726/4

(58) Field of Classification Search
CPC ... H04L 63/08; H04L 63/062; H04L 63/0407; H04L 9/0841; H04L 2209/80; H04L 9/321; H04L 9/32; H04W 12/02
USPC .............................................................. 726/4
See application file for complete search history.

(56) References Cited

U.S. PATENT DOCUMENTS 8,185,476 B2 *    5/2012  Zhu et al. ................ 705/59
2010/0275009 A1 * 10/2010  Canard et al. ........... 713/155

FOREIGN PATENT DOCUMENTS

EP        1 205 889 A1    5/2002

OTHER PUBLICATIONS

Ren et al. "Privacy Enhanced Access Control in Pervasive Computing Environments" Broadband Networks, 2005 2nd International Conference on Boston, MA Oct. 3-7, 2005, Piscataway, NJ, Oct. 3, 2005, XP010890247, pp. 384-393.

(Continued)

*Primary Examiner* — Kambiz Zand
*Assistant Examiner* — Aubrey Wyszynski
(74) *Attorney, Agent, or Firm* — Rothwell, Figg, Ernst & Manbeck, P.C.

(57) ABSTRACT

A method for preserving privacy during authorization in pervasive environments is described. The method includes an authorization phase in which the user is provided with a reusable credential associated with verifiable constraints, and an operation phase where the service provider verifies the reusable credential before authorizing the user. Third parties cannot link plural uses of the credential to each other, and the service provider cannot link plural uses of said credential to each other.

12 Claims, 4 Drawing Sheets

(56) References Cited

OTHER PUBLICATIONS

Kim et al. "A Lightweight Privacy Preserving Authentication and Access Control Scheme for Ubiquitous Computing Environment" Nov. 29, 2007, XP019083120,ICISC 2007; LNCS 4817, pp. 37-48.

Fan et al. "Date attachable electronic cash" Computer Communications, Elsevier Science Publishers BV, Feb. 1, 2000, XP004188279, ISSN: 0140-3664, vol. 23(4):425-428.

Ren et al. "A Novel Privacy Preserving Authentication and Access Control Scheme for Pervasive Computing Environments" IEEE Transactions on Vehicular Technology, vol. 55(4):1373-1384, 2006.

Li et al. "Further improvement on a novel privacy preserving authentication and access control scheme for pervasive computing environments", Computer Communications vol. 31:4255-4258, 2008.

Konidala et al. "A Capability-based Privacy-preserving Scheme for Pervasive Computing Environments" Proceedings of the 3rd Int'l Conf. on Pervasive Computing and Communications Workshops (PerCom 2005 Workshops), IEEE Computer Society, 2005, 5 pages.

* cited by examiner

PRIVACY PRESERVING AUTHORISATION IN PERVASIVE ENVIRONMENTS

CROSS REFERENCE TO RELATED APPLICATION(S)

This application is a 35 U.S.C. §371 National Phase Entry Application from PCT/EP2010/058846, filed Jun. 22, 2010, designating the United States, the disclosure of which is incorporated herein in its entirety by reference.

TECHNICAL FIELD

The present invention relates to authorisations capable of preserving privacy in pervasive environments.

BACKGROUND

In a pervasive (or ubiquitous) computing environment (PCE), computers and sensors are integrated into the user's surrounding environment, thus creating a convenient, information-rich atmosphere. In such an environment, it is expected that users will interact with many interconnected and smart devices, as well as with service providers, for accessing information and services of interest in a highly transparent manner. This field is commonly seen as the future of computing, when computational power will be available everywhere.

Despite the great potential of such solutions in providing new and improved services, their very own pervasive nature raises some important security concerns: on the one hand, from the service providers' perspective, it is important to prevent unauthorised users from accessing some (potentially paid) services, which has implications for the need for deploying billing, authentication and access control mechanisms; on the other hand, authorised users may want to keep their privacy when accessing those services. Therefore, in order to assure the success of PCEs, it is important to create a solution that combines these conflicting requirements.

This can be understood by considering a scenario shown schematically in FIG. 1, in which a user wants to access some protected service (or a group of them) whose identification is SID, offered by a Service Provider P 11. In order to do so, the equipment U 10 used by the user needs to have valid credentials issued by the Authentication Server S 12. These credentials (e.g. a certificate or a shared key on a smart card, e.g. SIM/USIM/ISIM, which is an application that typically runs on a Universal Integrated Circuit Card (UICC)) not only give access to the service, but also contain an access profile linked to the SID, denoted pfl, that determines the extent of the user's rights for that service; for example, in addition to the SID information, pfl may contain an expiration date or a usage limit or more general conditions under which the service is to be used. Therefore, using a valid credential, U 10 can access the specified service according to permissions and rules expressed by the corresponding pfl. It should be noted that U in this context can be understood as many different types of entities: a person, an electronic device, computer program, etc., but in practice U 10 refers to the equipment used by a user to access the PCE and its offered services.

In a commercial scenario, S 12 will deliver the requested credentials to U 10 only if some requirements are fulfilled, such as the payment of a fee per access or the acquisition of a service subscription. Thus, when trying to access the service, users are requested to prove that they can indeed do so, for example by presenting a payment receipt R. In order to prevent abuse, R should be bound to the user and to the requested service with the corresponding usage rights, thus enclosing the user identity and pfl; additionally, R must also have some unique identification and a valid signature from a Billing Authority B 13, the entity responsible for handling payments.

It will be noted that such a receipt may not be strictly necessary, since S 12 may have access to a database containing the payment status of all users (e.g., if S 12 and B 13 are implemented as a single entity), or can contact B 13 and charge the user dynamically (e.g., in a scenario where B 13 is a Mobile Network Operator and U 10 is a valid subscriber).

In this context, unless the users intentionally disclose their private information (or in case of users' misconduct attested by trusted authorities, i.e. a Lawful Interception scenario), a highly privacy-preserving system must ensure that: the real identity of the user interacting with the service is not revealed; different sessions are not linkable; the user's context information (e.g., location, type of service requested, usage preferences) is not disclosed to unauthorised entities; the communication between user and service is secured by means of confidentiality and integrity mechanisms.

Traditional access control schemes commonly rely on the pre-established trust relationship between users and service providers, which can be ascertained by means of security credentials issued by an Authentication Server (e.g., as in Kerberos). The actual structure and usage of such credentials depends on the system security requirements. For example, services provided by student campus PCEs usually are not too restrictive, and credentials that allow access until revoked may be enough. In comparison, commercial scenarios may require some special conditions to be met before the access is granted (e.g., the credentials acquired may have an expiration date associated to a subscription, or the credentials can be used only a limited number of times), especially for paid services. Note also that from the user's perspective, it is rather cumbersome to handle per-service pre-established trust, usually implying per-service unique username/password etc. Relying on a separate, service-independent authentication server is usually more convenient, but may create linkability and reduction of privacy as discussed below.

One significant issue with conventional access control solutions is that they tend not to protect the users' privacy, since the owner of the credential can be identified or at least be tracked (by the Service Provider and/or by external entities) whenever it is used for accessing some service. In order to address this subject, some schemes have proposed the adoption of blind signature schemes, which prevents any entity (including the Authentication Server) from establishing a relationship between an issued credential and its owner. However, the usage of blind signatures in these schemes prevents the Service Provider from imposing any constraint (e.g., an expiration date) to the signed credentials, which is especially undesirable in commercial scenarios. Although this specific problem could be solved simply by the deployment of so called partially blind signatures instead of purely blind ones, existing proposals also display some performance limitations (e.g., the number of asymmetric cryptographic operations performed) and/or security flaws (e.g., improper user authentication procedure) and/or may still have privacy flaws (e.g. various forms of traceability of the user being possible).

In the context of 3GPP mobile networks, the mobile infrastructure can be used to leverage many security-related services by means of the 3GPP defined Generic Authentication Architecture (GAA), which provides authentication and key agreement (AKA) mechanisms for applications and services. The use of GAA brings many advantages, not only in terms of client-side computational costs and management of credentials, but also in terms of privacy: even without revealing their identities, GAA-enabled users can establish shared keys with GAA-enabled service providers whenever needed. However, GAA offers no privacy from the point of view of the Mobile Network Operator (MNO) itself: since the MNO is responsible for creating the keys upon the reception of some user-identifiable information, this entity can easily identify the user behind every key request and eavesdrop any communication protected by these keys. Although the MNO can be considered trustful in many scenarios, the trust-level may not always be sufficient, especially for applications involving financial transactions, medical information or other security-sensitive data.

It is thus desirable to provide user privacy, user authentication, access control and accountability capabilities for commercial pervasive scenarios in a lightweight fashion, while avoiding issues appearing in existing solutions. It is also desirable to combine these with the features provided by GAA.

SUMMARY

It is an object of the present invention to address, or at least alleviate, the problems described above.

In accordance with one aspect of the present invention there is provided a method for authorising a user to a service provider in a communications network for accessing a service or group of services by providing the user with a verifiable service credential associated with verifiable constraints. In an authorisation phase, a value is created at the user for use as a user credential. The user credential is blinded at the user, together with the service constraints that are left in clear (i.e., a partially blinding scheme is employed) so as to generate a partially blinded credential, which is sent from the user to an authentication server. At the authentication server, a partially blinded signature is generated for the partially blinded user credential associated with the (plain) constraints so that, when unblinded, the partially blinded signature is verifiably associated with the user and service credentials. The partially blinded signature is returned to the user, which unblinds the partially blinded signature to generate a user access signature. The user generates an authorisation credential using the user access signature together with the user credential and verifiable constraints. In an operation phase, the user generates an initial service credential from the authorisation credential (this generation optionally includes encrypting the authorisation credential), and generates an initial access request message including the initial service credential. The initial access request message is sent to the service provider, and at least the initial service credential part is forwarded from the service provider to the authentication server. The authorisation credential is recovered from the initial service credential in the access request message by the authentication server and used to authorise the user. A notification message is sent from the authentication server to the service provider based on the outcome of the authorisation. If the notification message indicates successful authorisation of the user by the authentication server, then the service provider starts a session with the user granting access to the service in accordance with the aforementioned constraints. The authorisation credential can be reused for subsequent operation phases, but neither third parties nor the service provider can link plural uses of the service credential to each other or to the real user identity.

The user may send subsequent access request messages associated with the same authorisation credential, each including an subsequent service credential. The authentication server may maintain an association between the initial and subsequent service credentials and the authorisation credential, and use the subsequent service credential to recover the authorisation credential. The authentication server may update the subsequent service credentials using a cryptographic function each time an access request message is received from the user so as to produce a new subsequent service credential for identifying the authorisation credential when the next access request message associated with the same authorisation credential is received.

A symmetric authentication key may be generated at the user. The access request message may be encrypted with the authentication key before being sent to the service provider, and the authentication key encrypted and sent to the authentication server. The encryption may be with the authentication server's public key. The authentication key may be stored by the authentication server for use in decrypting subsequent access request messages from the user.

Optionally, the authentication server stores an indexed access counter which is incremented each time a valid access request message is received from the user.

The service provider and user may generate a shared symmetric service key for protecting data exchanged between the service provider and the user during usage, based at least on information included by the user. The service key may further depend on second information dependent on third information, the third information being provided from the user to the authentication server in a previous access request message, and the second information provided from the authentication server to the service provider.

The authorisation phase may be based on Generic Bootstrapping Architecture (GBA), in which case the user may be authenticated to the authentication server using GBA. The user may be authenticated to the authentication server during the authorisation phase using SIM, USIM or ISIM, e.g. implemented on a UICC card.

The authentication server may authenticate the service credential before generating the partially blinded signature.

The verifiable constraints may include a receipt of payment for the service, authorisation from a billing server to access the service, and/or an access profile for the service.

In accordance with another aspect of the present invention there is provided a network element for use by a user to authorise the user to a service provider in a communications network for accessing a service or group of services by generating and using a service credential associated with verifiable constraints. The network element comprises a communications functionality for sending and receiving data, a storage functionality for storing data; and a control functionality for controlling operation of the communications functionality and storage functionality. The network element is configured so that, in an authorisation phase, the control functionality generates a value for use as a user credential, and uses a partially blind scheme on the constraints (left as plaintext) and user credential (blinded) so as to generate a partially blinded credential. The communications functionality sends the partially blinded credential towards an authentication server, and receives a partially blinded signature from the authentication server. The control functionality unblinds the partially blinded signature to generate a user access signature. The control functionality generates an authorisation credential from the user access signature together with the user credential and constraints and stores it in the storage functionality. In an operation phase, the control functionality generates an initial service credential from the authorisation credential (optionally by encryption) and stores it in the storage functionality. The control function then generates an initial access request message including the initial service credential. The communications functionality sends the access request message towards a service provider, and receives authorisation from the service provider to access the service.

It will be appreciated that the network element could be a single device or could be a composite device comprising a computing device (e.g. PC, UE, sensor etc.) and a SIM, ISIM or USIM. The storage functionality and control functionality might therefore be distributed between more than one unit.

The control functionality may be configured to generate a symmetric authentication key in the operation phase, encrypt at least part of the access request message with the authentication key before it is sent to the service provider, and encrypt the authentication key with a public key of the authentication server. The communications functionality may be configured to send the encrypted authentication key towards the authentication server.

The control functionality may be configured to generate a symmetric service key for decrypting data received from the service provider based on information included in the access request message.

The control functionality may be configured to generate subsequent access request messages associated with the same authorisation credential, each including a subsequent service credential. The communications functionality may be configured to send the subsequent access request messages towards the service provider.

In accordance with another aspect of the present invention there is provided an authentication server for use in a communications network to authorise a user to a service provider for accessing a service or group of services by generating and authorising a service credential associated with verifiable constraints. The authentication server comprises a communications functionality for sending and receiving data, a storage functionality for storing data, and a control functionality for controlling operation of the communications functionality and storage functionality. The authentication server is configured so that, in an authorisation phase, the communications functionality receives a partially blinded credential (generated from a blinded user credential and the constraints kept in clear) from a user. The control functionality generates a partially blinded signature from the partially blinded credential, the partially blinded signature, when unblinded, being verifiably associated with the user credential and constraints. The communications functionality sends the partially blinded signature towards the user. In an operation phase, the communications functionality receives from a service provider an initial access request message originating from the user, the initial access message comprising at least an initial service credential. The control functionality recovers an authorisation credential from the initial service credential, the authorisation credential comprising a user access signature and the user credential and constraints, verifies that the user access signature is a valid signature for the user credential and constraints of the authorisation credential, and authorises the user. The communications functionality sends an acceptance message to the service provider.

The communications functionality may be configured to receive subsequent access request messages associated with the same authorisation credential, each including a subsequent service credential. The control functionality may be configured to identify an association between the initial and subsequent service credentials and the authorisation credential. The control functionality may be configured to use the subsequent service credential to identify the authorisation credential. The control functionality may also be configured to update the subsequent service credential using a cryptographic function each time an access request message is received from the user so as to produce a new subsequent service credential for identifying the authorisation credential when the next access request message associated with the same authorisation credential is received.

The received access request message may be encrypted by a symmetric authentication key. If so, the communications functionality is configured to receive an encrypted version of the authentication key, and the control functionality is configured to decrypt the authentication key and use the authentication key to decrypt the access request message so as to recover the authorisation credential. The control functionality may be configured to decrypt the authentication key using a private key of the authentication server.

The storage functionality may be configured to store the authentication key for use in decrypting subsequent access request messages associated with the same authorisation credential. The storage functionality may be configured to store an indexed access counter which is incremented each time a valid access request message is received from the user.

The control functionality may be configured to authenticate the user using Generic Bootstrapping Architecture and, if so, on the basis of a SIM, USIM or ISIM card held by the user.

In accordance with another aspect of the present invention there is provided a method of using a network element used by a user to authorise the user to a service provider in a communications network for accessing a service or group of services by generating and use a service credential associated with verifiable constraints. The method comprises, at the network element, generating a user credential. The constraints (kept in clear) and user credential (blinded) are partially blinded so as to generate a partially blinded credential, which is sent towards an authentication server. A partially blinded signature is received from the authentication server. The partially blinded signature is unblinded to generate a user access signature. An authorisation credential is generated using the user access signature together with the user credential and access profile. In an operation phase, an initial service credential is generated from the authorisation credential (optionally by encrypting the authorisation credential). An initial access request message is generated including the authorisation credential. The access request message is sent towards a service provider. Authorisation is received from the service provider to access the service.

In accordance with another aspect of the present invention there is provided a method of using an authentication server to authorise a user to a service provider for accessing a service or group of services by generating and authenticating a service credential associated with verifiable constraints. The method comprises, in an authorisation phase, receiving a partially blinded credential from the user, the partially blinded credential generated from the constraints (in clear) and a user credential (blinded). A partially blinded signature is generated from the partially blinded credential, the partially blinded signature, when unblinded, being verifiably associated with the user credential and constraints. The partially blinded signature is sent towards the user. In an operation phase, an initial access request message originating from the user is received from a service provider. The initial access request message includes at least an initial service credential. An authorisation credential (comprising a user access signature and the user credential and constraints) is recovered from the service credential. The authentication server verifying that the user access signature is a valid signature for the user credential and constraints of the authorisation credential and that the constraints in the authorization credential are fulfilled, authorises the user, and sends an acceptance message to the service provider.

The invention also provides a computer program, comprising computer readable code which, when operated by a network element, causes the network element to operate as a network element as described above.

The invention also provides a computer program, comprising computer readable code which, when run by an authentication server, causes the authentication server to operate as an authentication server as described above.

The invention also provides a computer program product comprising a computer readable medium and a computer program as just described, wherein the computer program is stored on the computer readable medium.

BRIEF DESCRIPTION OF THE DRAWINGS

Some preferred embodiments of the invention will now be described by way of example only and with reference to the accompanying drawings, in which.

DETAILED DESCRIPTION

Figure 1:
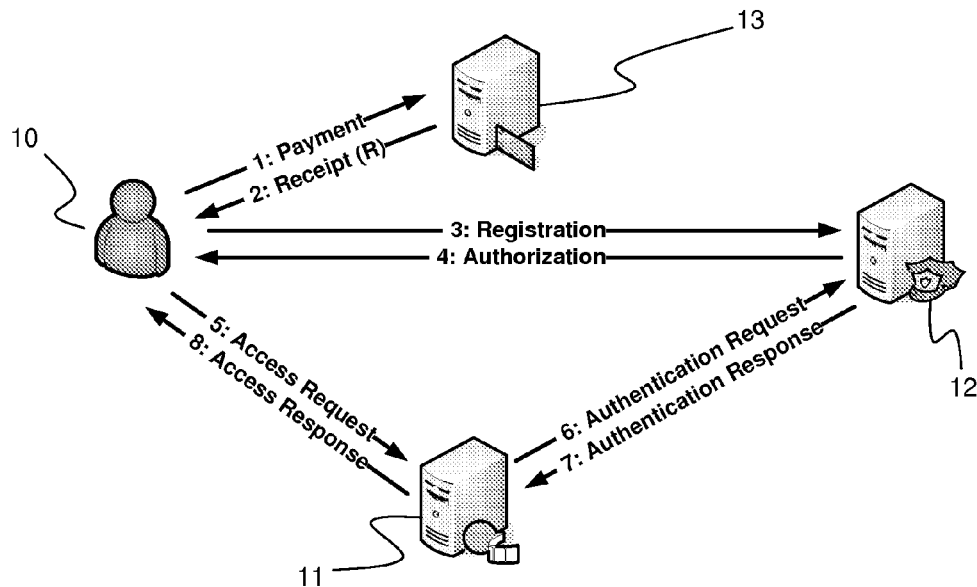
FIG. 1 is a schematic illustration of a scenario in which a user wishes to access a protected service.

The invention makes use of partially blind signatures and authenticated encryption schemes and therefore it may be beneficial to provide a brief overview of such schemes.
(Partially) Blind Signatures In blind signatures, the user disguises ("blinds") a message, typically by combining it in some way with a random "blinding factor", and then sends the result along with some information (e.g. a real user identity) to a server for signing. The server may perform some checks and, if the received information is considered valid, sign the blinded message using the desired signing algorithm. The resulting signature is sent back to the user, who then unblinds the signature/message. This has the effect that the unblinded signature can be publicly verified against the original (unblinded) message like a regular digital signature, but the server cannot recognize this signature beyond that it is some signature that it has previously made. Similarly, any third party (e.g. service provider) can also verify the signatures as made by the server, but it is not possible to link them to the signing process.

A possible analogy to the cryptographic blind signature is the physical act of enclosing a message in a special write-through-capable envelope, which is then sealed ("blinded") and signed by a signing agent. "Unblinding" corresponds to the user opening the signed envelope, retrieving the signed content. Thus, the signer is unable to observe the message content, but the signer or any third party can later verify the signature and know that the signature is valid within the limitations of the underlying signature scheme.

Blind Signature (BS) schemes allow a user to get some message signed without revealing any information about this message to the signing party. By comparison, Partially Blind Signatures (PBS) allow the signing party to verify some attributes of the message (i.e., a part of the message which is not blinded) before signing it; as a result, the signature is associated with both the blinded and unblinded parts of the message, in such a manner that the modification of any of these parts would invalidate the generated signature. In other words, a signature is partially blind if the underlying signing process includes some agreed common information that is known to the receiver as well as the signer.

A possible analogy to the cryptographic partially blind signature would be the above write-through-envelope analogy, but with the addition of a cut-out in the envelope (e.g. at one of the corners) which discloses part of the content to the signer.

These techniques allow the development of solutions such as e-cash, e-voting and anonymous access control. Moreover, it will be noted that both types of solutions can be implemented with a large variety of signing schemes, such as RSA, elliptic curves and identity-based cryptosystems.

Let $C_u$ denote some information that needs to be signed in such a manner that the signer does not learn the contents of $C_u$. (Later in the description, $C_u$ will be used as a random credential for a user U.) Using a PBS scheme, a valid signature on $C_u$ can be obtained in the following manner. First, the user and the signer must agree on a piece of common information, which corresponds to the verifiable message attributes that will be associated to $C_u$ and are denoted by pfI. These attributes could, for example, be related to some contract between the user and the signer, and are outside of the scope of the signature scheme. The user then "partially blinds" $C_u$ using the partially blinding function bl that typically takes the following input parameters: a random number, denoted r; the unblinded part of the message, which corresponds to pfI; and the message that shall be blinded, which corresponds to $C_u$. As a result, the user obtains the partially blind credential $C_{bl}$=bl(r; pfI,$C_u$), and sends both pfI and $C_{bl}$ to the signer. Upon reception of the user's request, the signer verifies pfI; if this common information is accepted (e.g., an expiration date that is allowed by the user's contract), the signer S signs the partially blinded credential together with pfI, using its private key $Priv_S$, and sends the resulting signature $C_{pbs}$={pfI,$C_{bl}$}$_{PrivS}$ back to the requester. Finally, the user reverses the blinding process by employing an unblinding function $bl^{-1}$, which typically takes the following input parameters: the same random number r used in the blinding process; the same pfI value used in the blinding process; and the signature generated by S, $C_{pbs}$. This process allows the user to retrieve a valid signature for $C_u$ and pfI from the received $C_{pbs}$. The valid signature retrieved in this manner is denoted $C_s$, which has the following property: it can only be used to validate the message $C_u$ if it is presented together with the embedded information pfI, i.e., pfI cannot be removed or modified from the triple (pfI,$C_u$,$C_s$) without invalidating $C_s$. As a direct result of this process, anyone with access to $Pub_S$ can verify the validity of the triple (pfI,$C_u$,$C_s$), known as an authorisation credential; however, not even the signer can link the user's real identity to this authorisation credential.

It will be noted that, in some scenarios, it may be necessary to be able to revoke the user's privacy in case of abuse. Even though such situations are not focussed on in this document, the proposed scheme is flexible enough to support mechanisms which allow the anonymity of a misbehaving user to be revoked by trusted entities.
Authenticated Encryption Schemes Many applications require the deployment of confidentiality and message authentication as security services. A straightforward approach for this is to adopt the Generic-Composition paradigm, according to which the encryption and authentication processes use two different and independent keys. However, a more lightweight solution is the deployment of Authenticated Encryption (AE) schemes, which seamless combine data confidentiality and authentication under a single key. Many such solutions also allow the authentication of non-encrypted data together with the encrypted information. An AE-scheme that supports the authentication of messages consisting of both plaintext and ciphertext in this manner is called an Authenticated Encryption with Associated Data (AEAD) solution, where the "associated data" (also called a header) refers to the portion of the message that is transmitted as plaintext. Some examples of AEAD solutions are EAX, GCM, and LetterSoup.

Using an AEAD scheme, the processing of a message M and an (optional) header H under key K produces as output $C||T=ae(M)(H)_K$, where C is the result of encrypting M and T is the message authentication tag for both M and H—we write simply $C||T=ae(M)_K$ in case H is omitted. Upon reception of $C||T$ and H, the receiver can verify the validity of T and recover M using the same key K applied during the encryption process. It is interesting to note that some AEAD schemes allow the receiver to check the authentication tag without having to decrypt the whole message, thus discarding invalid messages in an earlier stage.

Privacy Preserving Authorisation

A protocol to combine user privacy, user authentication, access control and accountability capabilities for commercial pervasive scenarios in a lightweight fashion may be divided into two phases: Authorisation and Operation.

During the Authorisation phase, users obtain their security credentials for accessing the service (i.e., the authorisation credential discussed above). The basic idea is that U 10 partially blinds a user credential $C_u$ and sends the result to S, together with the corresponding access profile pfl for accessing some service. S then processes this request, generating a partially blind signature that bounds the blinded user credential provided by U and the corresponding access profile pfl. After U unblinds this signature, the result can be used together with $C_u$ and pfl as basis for a service credential for gaining access to the service in a privacy preserving (or even anonymous) manner.

The Operation phase corresponds to the service consumption. Every access request performed by U to P comprises a service credential, related to the authorisation credential. The service credential is processed by the back-end Authentication Server S, which verifies the authenticity of it and the associated anonymous authorisation credential, compliance with pfl, etc. If the protocol runs successfully, U not only gains access to the service, but also generates two sets of secret keys: one shared with S—used for all future requests using the same authorisation credential—and another with P—used for protecting the current interaction only, and renewed in every access request. Hence, subsequent accesses can be efficiently encrypted and authenticated using an AEAD scheme with these symmetric keys.

The details of both phases are presented in the next sections; for convenience and easy consultation, a list of the notation used is provided in Table 1. In the discussion, it is assumed that users employ some technique for manipulating their physical address, which is a common requirement for anonymous communication but lies outside the scope of the invention.

TABLE 1

Notation used

It should be noted that X and Y may represent any of the entities shown in FIG. 1

| | |
|---|---|
| U | User |
| P | Service Provider |
| S | Authentication Server |
| B | Billing Authority |
| SID | Service Identification |
| R | Payment receipt |
| Pfl | Access profile which encloses the Service ID (SID) and verifiable constraints |
| i | Index identifier, counting the number of accesses, i = 1, 2, . . . |
| r | A random nonce |
| $K_{X,Y}$ | Key shared between two entities X and Y |
| $Priv_X$ | Private key of some entity X |
| $Pub_X$ | Public key of some entity X |
| $Cert_X$ | Certificate of some entity X |
| Bl | Partially blinding function |
| $C_u$ | A random credential created by U (also referred to as user credential) |
| $C_{bl}$ | $C_u$ after it is partially blinded |
| $C_{pbs}$ | Signature for $C_{bl}$ |
| $C_s$ | Signature for $C_u$ (user access signature) |
| (pfl, $C_u$, $C_s$) | Triple (also known as anonymous authorisation credential) of user U. Also used as service credential at the first access (i = 1). |
| $M^i$ | The $i^{th}$ access request message |
| Type | Flag to indicate first or later access |
| $\{M\}_K$ | Signature of M under key K |
| $E(M)_K$ | Encryption of M under key K |
| $ae(M)(H)_K$ | Authenticated-encryption of M (secret message) and H (public header) under key K |
| $ae(M)_K$ | Same as ae $(M)(H)_K$ when H (public header) is null |
| $ID^i_K$ | Service credential and andand index for key and authorisation credentials at the $i^{th}$ access for i = 2, 3, . . . |
| Session | Service/Session management information between U and P. |
| hash | Some cryptographic hash function, e.g. SHA-256 or Whirlpool |

Regarding Session, it will be noted that some services may be more or less "session-less", i.e. little or no state information is kept during the service usage. However, it will also be appreciated that, in the context of the present approach, an implicit session concept is created, comprising the one or more message exchanges between U and P, relating to the most recent authorisation of U made by P (assisted by S) in order to grant access to the service. Hence, at least the single bit of information held by P, whether U is authorised or not can be considered (part of) the session state information. Additionally, some embodiments also create a service key protecting the one or more message exchanges carried out during service usage. Thus, also this service key may be considered session state information. Hence, the term "Session" is still meaningful in the context of this document.

Authorisation Phase

Figure 2:
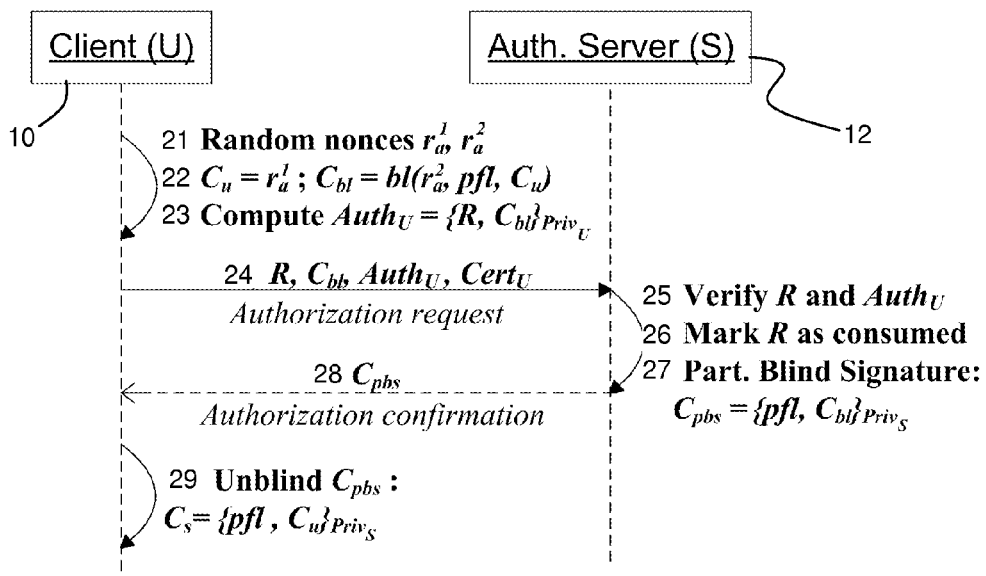
FIG. 2 is a schematic illustration of the steps involved in an authorisation phase.

Before the authorisation phase takes place, U acquires the public key of S, which typically corresponds to getting S's certificate, $Cert_S$. Moreover, for simplicity, in this and in the next sections it is generally assumed that U has acquired a receipt for payment for the service (although, as previously discussed, this may not be strictly necessary). After that, the authorisation phase protocol as depicted in FIG. 2 can take place, and works as follows:

21. Initially, U generates two fresh random nonces (i.e., numbers that can be used only once in the protocol in order to ensure that old communications cannot be reused in replay attacks), $r_a^1$ and $r_a^2$, which must be kept secret in order to assure the user's privacy.

22. The user credential $C_u$ is set to $r_a^1$, and the result is partially blinded together with pfl using the second nonce $r_a^2$, thus yielding $C_{bl}=bl(r_a^2,pfl,C_u)$. It is important to note that the value of pfl used in this manner cannot be freely chosen by U: the pfl value used here must have been defined in the receipt R, corresponding to the value used in the signature computed by S at the end of the Authorisation phase (which certainly uses the correct pfl). Any modified pfl value will be then detected and will invalidate the authorisation. (As previously discussed, if an explicit R is not used, we assume some other means available to S for verification of a payment or equivalent binding to pfl.)

23. Before sending the authorisation request to S, the pair $\{R,C_{bl}\}$ is signed by U using U's own private key, yielding $Auth_U=\{R,C_{bl}\}Priv_U$. This information is important because it allows S to authenticate U, thus preventing impersonation attacks.
24. U then sends the partially blinded value $C_{bl}$ to S, together with R, $Auth_U$ and $Cert_U$.
25. Upon reception of this data, S verifies the validity of $Auth_U$ using the certificate $Cert_U$, and that of R using the certificate from the Billing Authority, $Cert_B$. S also checks if the users specified in R and $Cert_U$ are the same.
26. If the alleged user identity U and the receipt R are both valid, R is marked as "consumed" in S's database, thus preventing double-spending; otherwise, the authorisation request is rejected.
27. S uses a Partially Blind Signature scheme for computing $C_{pbs}=\{pfl,C_{bl}\}_{Priv_S}$.
28. $C_{pbs}$ is sent back to U.
29. Finally, U unblinds $C_{pbs}$ and obtains the partially blind signature $C_s=\{pfl,C_u\}_{Priv_S}$, which can be verified using $Pub_S$.

The triple $(pfl,C_u,C_s)$ acquired after the completion of the authorisation protocol corresponds to the authorisation credential, which allows any one possessing it (in particular U) to access the service specified in pfl in a privacy preserving manner: although S knows the real identity of U during the whole authorisation protocol, this does not give S (nor any entity eavesdropping the network) any information about the actual values of $C_u$ or $C_s$ due to the use of the blinding scheme; hence, assuming that pfl is a widely generic value, common to many different users, not even S can link the user's identity to this triple. Due to the sensitive nature of the authorisation credential, it must be stored in a secure manner and not disclosed to unauthorised entities. As long as the authorisation credential is not compromised, the Authorisation protocol needs to be executed prior to the first access to the system, but does not need to be performed again until the user's credentials are made invalid due to the limitations defined by pfl, e.g. the expiry time.

Although only one credential is shown being sent in step 24, the authorisation protocol is flexible enough to allow U to obtain several authorisation credentials at the same time. In this manner, one can improve the scheme's performance by issuing (signing) plural credentials in a single protocol run.

It will be noted that the establishment of a secure connection between U and S is not strictly necessary for preventing impersonation attacks at this stage. This holds for two main reasons. First, since the credentials are blinded during the communication, eavesdroppers are not able to recover $C_s$ from the messages exchanged between U and S (steps 24 and 28). Second, even if an attacker is able to intercept the receipt R, it cannot be misused due to its binding to a single user identity U, which is verified during the Authorisation phase (step 25). Nonetheless, establishing a secure connection would still be advisable because: it improves privacy, preventing eavesdroppers from learning the receipts consumed; it provides better availability, since attackers cannot intercept a request, preventing it from reaching S, and replay it later aiming to cause the consumption of the receipt R.

Operation Phase

Figure 3:
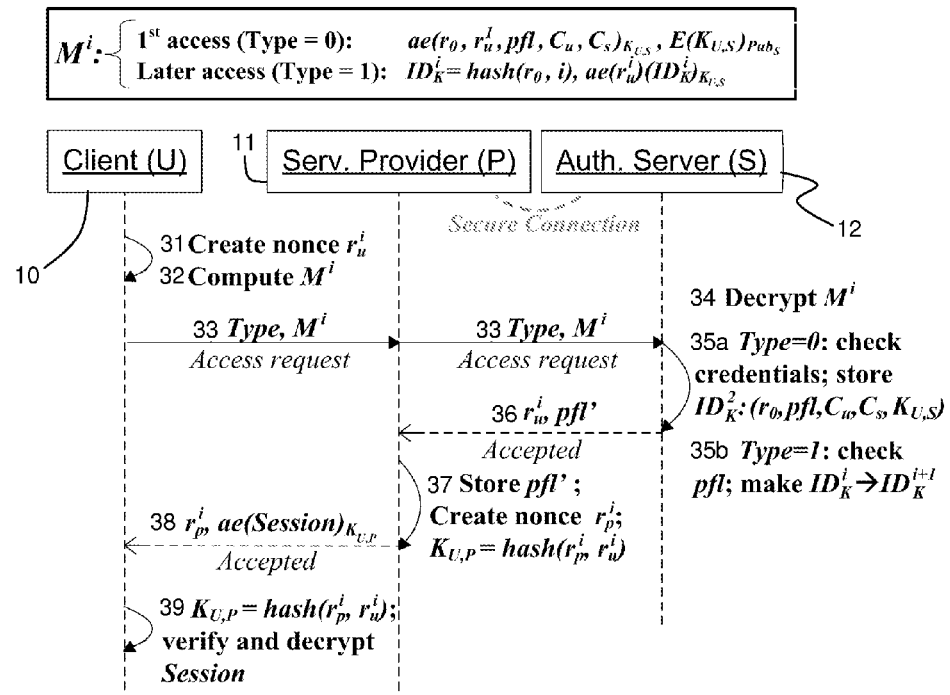
FIG. 3 is a schematic illustration of the steps involved in an operation phase.

Using the authorisation credential $(pfl,C_u,C_s)$ previously acquired during the authorisation phase, U can access/request the service according to Operation phase protocol, depicted in FIG. 3. In the following, the steps involved in the protocol and the reasoning behind their design are detailed. It will be recalled that the same authorisation credential may be used plural times to request the service. Below, the integer i−1 (i=1, 2, . . . ) denotes how many previous usages that has occurred.

31. For the $i_{th}$ request to access the service, U generates a fresh nonce $r_u^i$. In the first request (i=1), U also randomly generates a symmetric key $K_{U,S}$, and a fresh nonce $r_0$. and sets Type=0. Otherwise (when i>1) Type is set to 1.
32. U creates the access request message $M^i$. In the first request (signalled by setting Type=0 in the request) M encloses $r_u^1$ and $r_0$, as well as the authorisation credential $(pfl,C_u,C_s)$ (the authorisation credential acting directly as service credential), which allows U to prove the rights to access the requested service; the data that composes $M^i$ is encrypted with key $K_{U,S}$, while this symmetric key itself is sent under the protection of S's public key. This allows the establishment of a common secret key between U and S. For a subsequent access request (identified by Type=1), only the value of $r_u^i$ is encrypted and authenticated under this symmetric key (e.g. using an AEAD scheme), while the value $ID_K^i$=hash($r_0$, i) is only authenticated. In this case, $ID_K^i$ serves as the service credential. The reason why $ID_K^i$ is not encrypted is because it acts as an index for the key and the authorisation credential that shall be used for processing the $i_{th}$ request. Note, thus, that $K_{U,S}$ is used both to protect the fresh nonce $r_u^i$ (i>1) and to authenticate U.
33. Then, U sends Type and $M^i$ to P, which simply forwards this request to the back-end Authentication Server S for verification. Here we assume the existence of a secure channel between P and S, which is not strictly necessary for this step (since the forwarded message is already encrypted), but is typically required when S sends its response (step 36). The mechanisms to protect this channel is outside the scope of the invention but common mechanisms such as TLS, IPsec, etc may be used.
34. Upon the reception of M, S verifies its authentication tag; if this is a valid message, S decrypts it with the correct value of $K_{U,S}$. This key is retrieved from S's database using the service credential index $ID_K^i$ provided in plaintext (if Type=1), or from the message itself, after decryption with the private key $Priv_S$ (if Type=0). It will be noted that the counter ii used for the generation of $ID_K^i$ can also be employed for accountability purposes, allowing S to effectively control the number of access requests performed using the same credentials.
35. When Type=0 (35a), S needs to verify the service credential $(pfl,C_u,C_s)$ (which now acts directly as authorization credential), and also that it has not been previously presented. Indeed, S should store the triple $(pfl,C_u,C_s)$ until its expiration in order to prevent re-use or replay attacks. If this validation process is successful, S adds $(pfl,C_u,C_s)$, $r_0$ and $K_{U,S}$ to its database, setting an access counter i (initialized at 1 and incremented for each new valid request) to this record and indexing it with $ID_K^2$=hash($r_0$,2). On the other hand, if Type=1 (35b), then at this point the user is already authenticated due to the previous step: only the authorised user knows the value of the secret key $K_{U,S}$ indexed by the service credential $ID_K^i$ and can compute the correct authentication tag for the request message. Therefore, all S needs to do in this step is to check the constraints defined in pfl. If there are no restrictions in pfl that prevent U from accessing the service, S increments the corresponding record's access counter and updates its index (i.e. pre-computes the next service credential) to $ID_K^{i+1}$.

36. If any of the authentication processes performed in the previous steps fails, a service denial message may be sent back to P, which relays it to U; such error messages should be authenticated using $K_{U,S}$, thus allowing U to verify that it was generated by S. In a successful run, though, P receives $r_u^i$ and a subset of pfl, called pfl'; this latter piece of data encloses any information from pfl that is relevant for P when interacting with U, and must thus be stored during the service usage (e.g. during a session). Examples of such information include the value of SID and any access constraints that must be enforced by P (e.g., the maximum duration of a session, which is useful for revocation purposes).

37. P creates a fresh nonce $r_p^i$ and then uses it in combination with the information received from S to compute a new service key $K_{U,P}$=hash($r_p^i$, $r_u^i$); this key will be used for encrypting and authenticating the communication between U and P. P also generates a Session, which corresponds to the service/session management information (e.g., it could be a simple session identifier), and uses an AEAD scheme initialized with $K_{U,P}$ to encrypt and authenticate this piece of information.

38. P sends $r_p^i$ and ae(Session)$_{K_{U,P}}$ back to U.

39. Optionally, upon the reception of P's response, U uses $r_p^i$ and its own $r_u^i$ to compute the same $K_{U,P}$ as P, and then decrypts and authenticates the Session using this key. A correct authentication tag indicates that the message sender has generated $K_{U,P}$ with the value of $r_u^i$ sent in step 33, which confirms that the correct S decrypted the request message provided by U. This allows U to authenticate not only S, but also P, since we can assume that a valid S would not deliver $r_u^i$ to an untrusted entity. Therefore, $K_{U,P}$ and the Session can be used to protect the access to the requested service during this session.

It should be stressed that, from P's (as well as from an eavesdropper's) point of view, the access requests are always anonymous and not linkable. Indeed, for each access request performed after the first access to the service, U computes a new service credentialcredentia $ID_K^i$ that identifies the key shared with S. Although these service credentials credential are sent in plaintext in step 33 of the Operation protocol, they are not linkable by someone who does not know the (randomly-generated) value $r_0$ due to the cryptographic hash construction of these indices. The sequence of service credentials $\{ID_K^i\}$ used in subsequent accesses are mutant, pseudo-random identifiers for information stored at S, but they are not linked to any identifier of the user U. In comparison, from S's point of view, the anonymous access requests can only be linked while the same authorization credential (and, thus, the same $r_0$ shared with U) is reused; nonetheless, not even S can link requests from the same user employing different credentials, neither determine which are the services actually accessed in a session between U and P: for example, if SID refers to a list of movies, P would not be able to pinpoint each accessed movie. Therefore, the proposed solution provides a trade-off between perfect unlinkability (achieved when there is no credential reuse) and improved performance (otherwise).

It will also be noted that U and S must be capable of computing the same $ID_K^i$ in every request: otherwise, S will not be able to retrieve the correct $K_{U,S}$ from its database. This implies the need of keeping a synchronized value of the access counter i between these two entities. Therefore, it is important to consider the deployment of error-recovery mechanisms for preventing this counter from being mistakenly incremented by any of the two parts, e.g. by a communication failure somewhere in the protocol.

It will be noted that the operation phase protocol is on-line in the sense that S must be present during service usage (at least initially during the access request).

Finally, it will be noted that the accidental collision of $ID_K^i$ (i.e., in the current request, a newly computed $ID_K^i$ coincides with another index already present in S's database) is not a serious issue: since every message is authenticated, S can simply check all keys corresponding to a same $ID_K^i$ and assume that the correct key is the one that leads to a correct authentication tag. Alternatively, if an imminent collision is detected, then S could compute $ID_K^i$ with increasing counter numbers until a suitable value is found, and then ask U to update its own counter accordingly; obviously, this artificial counter increment should have no effect on the service accountability, since this situation does not correspond to real accesses. Moreover, by proper choice of the hash function, probability of collisions is negligible.

The approach described above allows users to interact with S and P in an anonymous fashion, by using verifiable credentials. It also provides non-linkability between access requests, except from the point of view of S, which can track the (anonymous) requests linked to a same credential for the purposes of authentication; it will be noted that this leads to a higher level of privacy when compared to prior art solutions that also allow P to track U in the same manner, or that allow any entity monitoring the network to do so. Furthermore, the adoption of an AEAD scheme thwarts attackers from eavesdropping the communication or tampering with the transmitted data, and the fact that only U and P knows the key $K_{U,P}$ assures full confidentiality during each session. Finally, the fact that SID is never transmitted in plaintext has the additional advantage of preventing unauthorised entities to learn about the services popularity.

In order to ensure user authentication and non-repudiation during the Authorisation phase, the request itself is signed instead of the partially blinded credential. Hence, in Authorisation phase, S verifies the identity of U before signing the credential provided (authentication), and U cannot deny this request or the usage of the corresponding receipt (non-repudiation). Moreover, U can verify the signature received using $Cert_S$, thus authenticating S. During the Operation phase, the anonymous user is also authenticated by S (either through the presentation of the acquired credentials, or through the knowledge of a shared key) and vice-versa. It will be noted that the non-repudiation property is not provided during the Operation phase due to the anonymity of U, unless some anonymity revocation mechanism is employed.

The described approach allows the addition of a verifiable access profile into the user's authorisation credential, providing a more fine-grained access control and making accountability easier. This property is not provided by prior art schemes that adopt purely blind signatures.

Some prior art proposals require each service to have its own certificate in order to provide differentiated access control. As a result, a popular S would need to store and manage a large number of certificates from the service providers; analogously, users that access many different services would need to store and validate as many certificates. The approach described above adopts an uncomplicated and more scalable strategy for managing certificates: S's certificate can be used for a wide range of services and, thus, it is the only information that both S and U need to handle in the proposed protocol. At the same time, differentiated access control is still provided because all information concerning the user's access rights are available in pfl, which is bound to the acquired authorization credential.

The approach described above also decreases storage overhead. Consider the scenario where U wants to access the service n times using the same credential. In the proposed approach, U needs to store only the authorization credential (pfl,$C_u$,$C_s$) prior to the first access; afterward, the only information needed by S for authenticating U is $r_0$, $K_{U,S}$ and a log(n)-bit counter, although the storage of the aforementioned credentials is also recommended. The memory usage is thus far smaller than in many earlier schemes such as those based on hash chains for creating credentials which require U to store n hash values (i.e., the whole chain) in order to avoid the burden of executing many hash operations before each access.

The approach also decreases communication overhead. Consider again the scenario described in the previous paragraph. Using the approach described above, the amount of data sent by U in the Authorisation phase is limited to the receipt R, the partially blinded credential $C_{bl}$, the user authenticator $Auth_U$ and the certificate $Cert_U$: in this phase, the communication overhead is not especially high, although it can be higher if the credential include a large number of restrictions, e.g. a large XACML file.

However, it will be noted that only the first request of the Operation phase involves the transmission of credentials, while all other requests require U simply to send an authenticated encrypted nonce and a hash value. This means that the amount of data transmitted is potentially much lower than that sent in prior arts which apply public-key operations for encrypting and/or signing a part of the data in all requests, which typically leads to large data structures.

The approach described above also has benefits for computation overhead. One effect of the approach is to reduce the number of asymmetric cryptographic operations, since they are much more resource-demanding than symmetric ones. This concern is especially perceptible in the Operation phase, in which only the first request involves asymmetric encryption, while all other accesses linked to a same credentials are conducted using a symmetric key.

As mentioned before, U and S must be synchronized in order to compute the same $ID_K^i$. This is a direct consequence of sequential linking of different accesses by the access counter. However, it will be noted that this drawback is compensated by the fact that such an approach allows simpler computations between subsequent requests, greatly improving performance when compared to schemes in which this link does not exist. Moreover, synchronization losses are unlike to go unnoticed: both sides should update their counters only after a successful run of the Operation phase, or in some special cases for avoiding collisions.

The scheme provides privacy without the need of any special underlying network architecture such as "mist routers" or a "lighthouse".

GAA Bootstrapping

As discussed in the background above, many security-related services may be enabled by means of the Generic Authentication Architecture (GAA), which provides authentication and key agreement (AKA) mechanisms for applications and services. The Authorisation phase discussed above may be one such service.

The Generic Authentication Architecture (GAA) consists of a set of specifications that describe how the cellular security infrastructure can be used to provide a general-purpose (smart card based) authentication and key agreement (AKA) service for applications and services. This solution can assure the creation of reliable security credentials, instead of depending on (potentially weak) passwords generated by the user. It can also assure that different credentials are used in different services, preventing security issues related to password reuse that commonly appear as the number of services accessed by the user grows. It is also more efficient than schemes making use of asymmetric cryptography as discussed above.

In addition, GAA provides a standardized infrastructure for service providers, which do not need to bother with the distribution of secure credentials for all its users. The fundamental building block of GAA is the Generic Bootstrapping Architecture (GBA), which is specified by 3GPP (3rd Generation Partnership Project) in TS 33.220. GBA provides mechanisms for the secure establishment of a shared key between application servers and mobile devices, provided that the user has valid credential for communicating with the Mobile Network Operator (MNO) (e.g., a smart card application containing a key shared with the MNO, such as a SIM, USIM or ISIM). Nonetheless, GAA also provides support for subscriber certificates for applications that require asymmetric encryption/authentication.

Figure 4:
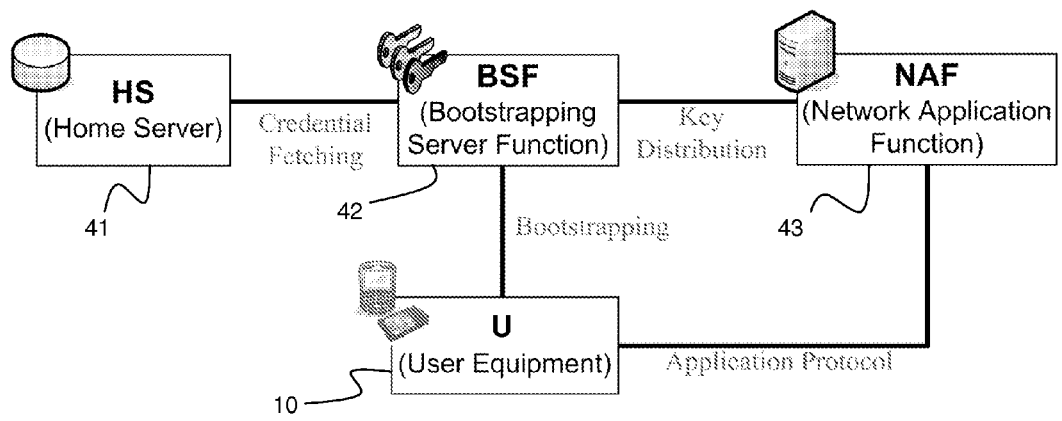
FIG. 4 is a schematic illustration of the main components of the Generic Authentication Architecture (GAA) and Generic Bootstrapping Architecture (GBA)

FIG. 4 shows the main GAA/GBA components. Their specific roles in the system are:

Home Server (HS) 41: the subscriber database, which contains the long-term subscriber key for each subscriber. In UMTS networks, the Home Server is known as Home Subscriber Server (HSS), while in GSM networks, this component is known as Home Location Register (HLR)/Authentication Centre (AuC).

Bootstrapping Server Function (BSF) 42: a trusted entity which is involved in authentication and key exchange between the user equipment and the Network Application Function (NAF) 43. This is a new network function introduced in GAA, which facilitates the use of AKA to bootstrap a new GAA master session key.

Network Application Function (NAF) 43: the server functionality of each GAA enabled server application.

User Equipment (U) 10: the client device containing a smart card issued by the Mobile Network Operator.

The main procedures involved in the GAA operation are (1) Bootstrapping, which corresponds to the generation of a shared key between the user equipment and the BSF, and (2) Authentication, which corresponds to the usage of the bootstrapped keys.

The GAA Bootstrapping process is as follows. There are a few differences between the 3G (USIM based) and 2G (SIM based) bootstrapping operations. There are also slight differences depending on how much of the functionality resides in the smart card (GBA-U vs GBA-ME), but, overall, they all involve the following steps:

1. U initiates bootstrapping by sending an HTTP request to BSF with an identity parameter.
2. This triggers a run of authentication protocol between U and HS, with the BSF acting as intermediary. At the end of this process, U and BSF obtain a shared key $K_{BSF}$.
3. BSF receives a set of application-specific user profiles from the HS.
4. BSF generates a B_TID transaction identifier and stores $K_{BSF}$, B_TID and the user profiles. It also chooses a suitable key lifetime according to its local policy.
5. BSF then sends the B_TID and the key lifetime to U.
6. U stores B_TID, $K_{BSF}$ and the key lifetime.

At the end of this process, the bootstrapping is complete: U and BSF share a temporary master key $K_{BSF}$, as well as a transaction identifier B_TID associated with this key. It will be noted that the GAA Bootstrapping procedure is a prerequisite for the GAA Authentication procedure. Nevertheless, since the bootstrapped key is not dependent on the actual service to be used, a single GAA Bootstrapping run can be used for several GAA Authentications.

Unlike the GAA Bootstrapping phase, the GAA Authentication procedure involves the application server (i.e., the NAF). Although the GAA specification allows many application-specific protocols to be used in this procedure, the basic operations involved from GAA's perspective are as follows:

1. U derives the key $K_{NAF}$ from $K_{BSF}$ and $NAF_{id}$.
2. U sends a request to NAF containing, in addition to application-specific parameters, the B_TID.
3. NAF sends to BSF its own $NAF_{id}$ and the B_TID received from U.
4. BSF uses the $K_{BSF}$ corresponding to B_TID and the given $NAF_{id}$ to compute the same key $K_{NAF}$ as U. If the B_TID is not available at BSF, BSF will send a 'B_TID unknown' error reply to NAF.
5. BSF supplies NAF with the requested key $K_{NAF}$ and its corresponding lifetime. It also provides some application-specific user settings for this NAF.
6. NAF then continues with the protocol used with U and, from this point on, they can use the common $K_{NAF}$ to protect their communication.

Note that U's ability to derive the correct key $K_{NAF}$ serves as a basis to prove to the NAF that the user is who he/she claims to be and can thus be authorised.

Authorisation Phase Using GAA

Figure 5:
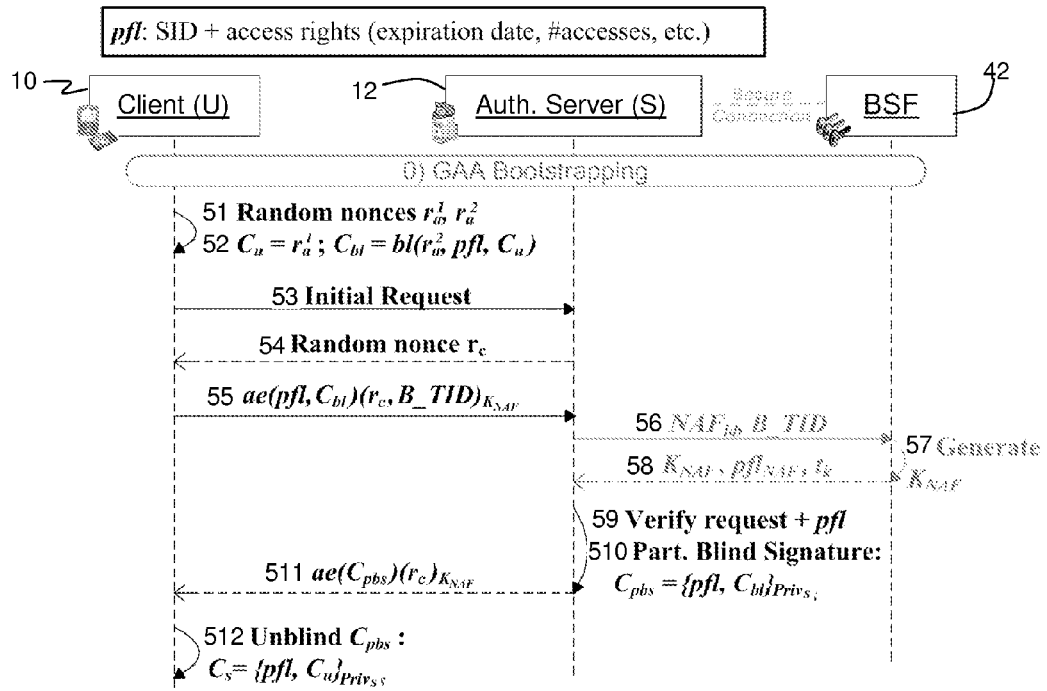
FIG. 5 is a schematic illustration of an authorisation phase using GAA.

Instead of the authorisation phase described above and in FIGS. 2 and 3, FIG. 5 illustrates an alternative authorisation phase, showing how a user U can employ a GAA-enabled equipment to acquire (one or more) anonymous authorization credential(s) from a valid Authentication Server S (which may or may not be controlled by the MNO). As mentioned, this further limits the number of asymmetric cryptography operations that need to be used. It will be noted that this protocol is an extension of the GAA's Authentication procedure described above, in such a manner that S takes the role of a NAF. Basically, this is a "double bootstrapping" where basic GBA bootstrapping is further used to bootstrap authorisation credentials. The notation used is similar to that for the authorisation phase described above, with the addition of $X_{id}$ for the ID of entity X, $K_X$ for a key between U and X, and $t_K$ for a key lifetime.

The steps involved in this authorization phase are detailed in the following:

50. If U does not have an active key $K_{BSF}$ bootstrapped with BSF, then it performs a GAA Bootstrapping run as described above; otherwise, U can skip this step.
51. U generates two fresh random nonces, $r_a^1$ and $r_a^2$, which must be kept secret in order to assure the privacy of the whole process.
52. The user credential $C_u$ is set to $r_a^1$, and the result is partially blinded together with pfl using the second nonce $r_a^2$, thus yielding $C_{bl}=bl(r_a^2,pfl, C_u)$.
53. The user sends a request to S, informing the intention of getting an anonymous credential.
54. S answers with a random challenge $r_c$.
55. U then computes the challenge response as $ae(pfl,C_{bl})(r_c, B\_TID)_{K_{NAF}}$, and sends it to S. Preferably, this response is encrypted between U and S, e.g. using TLS and S's public key (see below).
56. If S does not have an active $K_{NAF}$ for decrypting and verifying U's response, S provides the BSF with its own $NAF_{id}$ and with the B_TID informed by U; otherwise, S can go directly to step 59 below.
57. BSF computes the $K_{NAF}$ corresponding to the given B_TID and $NAF_{id}$.
58. BSF sends to S the computed $K_{NAF}$, this key's lifetime $t_k$, and possibly some application-specific settings $pfl_{NAF}$; examples of settings that could be useful for the S include the maximum service charge, and limitations related to pfl (e.g., the maximum credential's expiration date, or a list of forbidden service types).
59. S then checks the authenticity of the information provided by U. This verification process prevents impersonation attacks—since the GAA architecture assures that only the real user has access to the correct $K_{NAF}$—and also replay-attacks—due to the presence of the requested $r_c$ in the authenticated response provided by U. For authentic messages, S also verifies if the provided value of pfl does not infringe any local policies or the setting defined in the $pfl_{NAF}$ obtained from BSF.
510. S uses a PBS scheme for computing $C_{pbs}=\{pfl,C_{bl}\}_{PrivS}$. It is important to note that the value of pfl informed by U in 55 must be the one actually used by U in the partial blinding process (step 52), or the signature computed by S in this manner will not be useful for accessing the service.
511. $C_{pbs}$ is encrypted and authenticated together with $r_c$ using $K_{NAF}$, and then sent to U.
512. The reception of an authentic $ae(C_{pbs})(r_c)_{K_{NAF}}$ guarantees that it was computed by the correct S, since $r_c$ is a fresh nonce and BSF would not carelessly deliver the key $K_{NAF}$ to another entity. Therefore, U can safely decrypt and unblind $C_{pbs}$ to obtain the signature $C_s=\{pfl,C_u\}_{PrivS}$ for the requested credential.

Thus the resulting partially blind signature is the same as that obtained using the authorisation phase described above, and the operation phase can proceed unchanged. Since pfl is encrypted using $K_{NAF}$, the only entities that can learn about the services asked are S and BSF, and the latter would be obliged to eavesdrop the communication between U and S in order to do so. It will be noted that, in step 55, if B_TID is sent unencrypted, this means that any eavesdropping party can correlate B_TID values to each other, therefore some form of transport encryption is recommended. Even with such encryption, S can still correlate B_TID values. However, only BSF can actually correlate the value of B_TID with the real identity of U, while the user asking for credentials is completely anonymous from S's (or any other entity's) point of view. Finally, neither S nor BSF have access to the actual values of $C_u$ or $C_s$ due to the blinding process; hence, assuming that pfl is a widely generic value, common to by many different users, not even BSF can link the user's identity to the credentials when they are presented during the Operation phase for accessing the service (i.e., the service consumption itself is completely anonymous).

As long as the credentials are not compromised or made invalid due to the limitations defined by pfl, a single run of the Authorisation protocol is enough for allowing privacy-preserving access to the system. Actually, although only one authorisation credential is shown being sent in step 55, the authorisation protocol is flexible enough to allow U to present several authorisation credentials at the same time. Therefore, even if GAA already provides a higher efficiency through the elimination of asymmetric operations (it will be noted that U does not need to use or even have a public-key certificate), one can improve the scheme's performance even more by signing many credentials during the same run of the Authorisation phase protocol.

Finally, it will be noted that MNO's infrastructure can also be used for empowering services such as performing payment: before generating the blind signature (step 510 of the Authorisation phase), S could require the payment of a certain fee, which could then be included in the users' cell phone bill (or deducted from their prepaid credit) after their approval.

Figure 6:
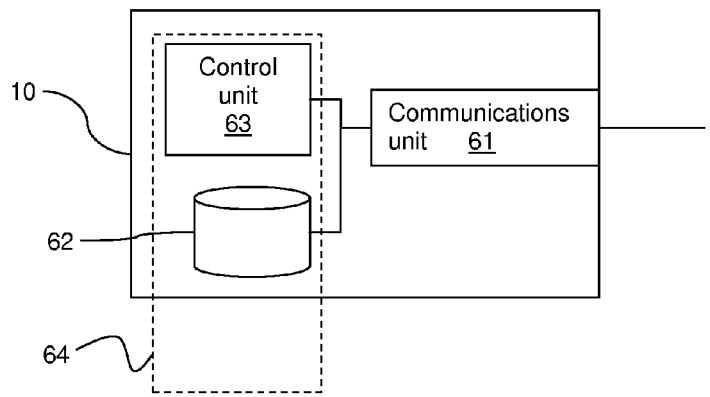
FIG. 6 is a schematic illustration of a user equipment.

FIG. 6 is a schematic illustration of an exemplary network element such as a user equipment 10. The network element includes a communications functionality 61 for sending and receiving data, a storage functionality 62 for storing data, and a control functionality 63 for controlling the operation of the communications functionality 61 and storage functionality 62. It will be appreciated that the control functionality 63 can be operated by hardware or software. The control functionality 63 enables the network element 10 to carry out the operations described above. The storage functionality as well as at least some of the security related processing may at least partially be implemented in a tamper resistant smart card module (e.g. SIM, ISIM, USIM) 64, holding secret keys associated with the user. This smart card module 64 may be removably attached to the rest of user equipment 10.

Figure 7:
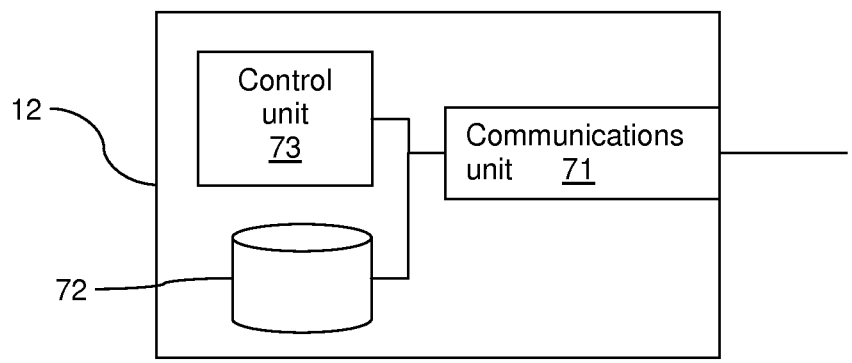
FIG. 7 is a schematic illustration of an authentication server.

FIG. 7 is a schematic illustration of an exemplary authentication server 12. The authentication server 21 includes a communications functionality 71 for sending and receiving data, a storage functionality 72 for storing data, and a control functionality 73 for controlling the operation of the communications functionality 71 and storage functionality 72. It will be appreciated that the control functionality 73 can be operated by hardware or software. The control functionality 73 enables the authentication server 72 to carry out the operations described above.

The invention claimed is:

1. A method of using a network element used by a user to authorise the user to a service provider in a communications network for accessing a service or group of services by generating and using a service credential associated with verifiable constraints, the method comprising:
generating a random value for use as a the user credential;
partially blinding the verifiable constraints and user credential to generate a partially blinded credential, the verifiable constraints being kept in clear and the user credential being blinded;
sending the partially blinded credential towards an authentication server;
receiving a partially blinded signature from the authentication server;
unblinding the partially blinded signature to generate a user access signature;
generating and storing an authorisation credential using the user access signature together with the user credential and a access profile;
generating and storing an initial service credential from the authorisation credential;
generating an initial access request message including the initial service credential;
sending the access request message towards a service provider; and
receiving authorisation from the service provider to access the service.

2. The method of claim 1, further comprising:
generating a symmetric authentication key;
encrypting at least part of the access request message with the authentication key before it is sent to the service provider;
encrypting the authentication key with a public key of the authentication server; and
sending the encrypted authentication key towards the authentication server.

3. The method of claim 1, further comprising:
generating subsequent access request messages associated with the same authorisation credential, each including an unencrypted subsequent service credential; and
sending the subsequent access request messages towards the service provider.

4. A method of using an authentication server to authorise a user to a service provider for accessing a service or group of services by generating and authenticating a service credential associated with verifiable constraints, the method comprising:
receiving a partially blinded credential from the user, the partially blinded credential generated from the verifiable constraints kept in clear and a blinded user credential;
generating a partially blinded signature from the partially blinded credential, the partially blinded signature, when unblinded, being verifiably associated with the user credential and the verifiable constraints;
sending the partially blinded signature towards the user;
receiving from a service provider a message originating from the user, the message including at least an initial service credential;
recovering an authorisation credential from the message, the authorisation credential comprising a user access signature and the user credential and the verifiable constraints;
verifying that the user access signature is a valid signature for the user credential and the verifiable constraints of the authorisation credential and that the verifiable constraints in the authorization credential are fulfilled;
authorising the user; and
sending an acceptance message to the service provider.

5. The method of claim 4, further comprising:
receiving subsequent access request messages associated with the same authorisation credential, each including an unencrypted subsequent service credential;
identifying an association between the initial and subsequent service credentials and the authorisation credential; and
using the subsequent service credential to identify the authorisation credential.

6. The method of claim 5, wherein:
updating the subsequent service credential using a cryptographic function each time an access request message is received from the user to produce the service credential for identifying the authorisation credential when the next access request message related to the same authorisation credential is received.

7. The method of claim 4, further comprising:
encrypting the received access request message by a symmetric authentication key;
receiving an encrypted version of the authentication key;
decrypting the authentication key; and
using the authentication key to decrypt the access request message so as to recover the authorisation credential.

8. The method of claim 7, further comprising storing the authentication key for use in decrypting subsequent access request messages associated with the same authorisation credential.

9. The method of claim 5, further comprising storing an indexed access counter and incrementing the indexed access counter each time an access request message is received from the user.

10. The method of claim 4, further comprising authenticating the user using Generic Bootstrapping Architecture.

11. The method of claim 10, further comprising authenticating the user on the basis of a SIM, USIM or ISIM.

12. The method of claim 7, wherein the authentication key is encrypted with a public key of the authentication server, the method further comprising decrypting the authentication key with a private key of the authentication server.

* * * * *

UNITED STATES PATENT AND TRADEMARK OFFICE
CERTIFICATE OF CORRECTION

| | |
|---|---|
| PATENT NO. | : 8,887,246 B2 |
| APPLICATION NO. | : 13/806119 |
| DATED | : November 11, 2014 |
| INVENTOR(S) | : Näslund et al. |

Page 1 of 1

It is certified that error appears in the above-identified patent and that said Letters Patent is hereby corrected as shown below:

On the Title Page, in Item (12), under "United States Patent", in Column 1, Line 1, delete "Naslund" and insert -- Näslund --, therefor.

On the Title Page, in Item (75), under "Inventors", in Column 1, Line 1, delete "Naslund," and insert -- Näslund, --, therefor.

On the Title Page, in Item (75), under "Inventors", in Column 1, Line 2, delete "Cristina Carvalho," and insert -- Cristina Melo de Brito Tereza Carvalho, --, therefor.

IN THE SPECIFICATION

In Column 12, Line 10, delete "$i_{th}$" and insert -- ith --, therefor.

In Column 12, Line 15, delete "M" and insert -- $M^i$ --, therefor.

In Column 12, Line 30, delete "$i_{th}$" and insert -- ith --, therefor.

In Column 12, Line 41, delete "M," and insert -- $M^i$, --, therefor.

IN THE CLAIMS

In Column 19, Line 37, in Claim 1, delete "a the" and insert -- a --, therefor.

Signed and Sealed this
Eighth Day of March, 2016

Michelle K. Lee
*Director of the United States Patent and Trademark Office*